US012126121B2

(12) United States Patent
Estremera et al.

(10) Patent No.: US 12,126,121 B2
(45) Date of Patent: Oct. 22, 2024

(54) ELECTRIC PLUG FOR CONNECTION TO A VEHICLE CAMERA, AS WELL AS ARRANGEMENT

(71) Applicant: Connaught Electronics Ltd., Tuam (IE)

(72) Inventors: Joseph Estremera, Tuam (IE); Richard Tadle, Tuam (IE)

(73) Assignee: CONNAUGHT ELECTRONICS Ltd., Tuam (IE)

( * ) Notice: Subject to any disclaimer, the term of this patent is extended or adjusted under 35 U.S.C. 154(b) by 334 days.

(21) Appl. No.: 17/780,563

(22) PCT Filed: Nov. 25, 2020

(86) PCT No.: PCT/EP2020/083327
§ 371 (c)(1),
(2) Date: May 27, 2022

(87) PCT Pub. No.: WO2021/105189
PCT Pub. Date: Jun. 3, 2021

(65) Prior Publication Data

US 2023/0352881 A1 Nov. 2, 2023

(30) Foreign Application Priority Data

Nov. 27, 2019 (DE) ..................... 10 2019 132 167.0

(51) Int. Cl.

*H01R 13/6582* (2011.01)
*H01R 13/6597* (2011.01)
*H01R 13/22* (2006.01)

(52) U.S. Cl.

CPC ..... *H01R 13/6582* (2013.01); *H01R 13/6597* (2013.01); *H01R 13/22* (2013.01); *H01R 2201/26* (2013.01)

(58) Field of Classification Search

CPC ....................... H01R 13/6582; H01R 13/6597; H01R 13/22; H01R 2201/26; H01R 11/18;

(Continued)

(56) References Cited

U.S. PATENT DOCUMENTS 3,980,380 A * 9/1976 Cieniawa ............... H01R 24/38 439/656
5,871,371 A * 2/1999 Rothenberger ........ H01R 12/75 439/579

(Continued)

FOREIGN PATENT DOCUMENTS

JP 2007022364 A 2/2007

OTHER PUBLICATIONS

International Search Report and Written Opinion in corresponding International Application No. PCT/EP2020/083327, dated Feb. 24, 2021 (14 pages).

*Primary Examiner* — Travis S Chambers
(74) *Attorney, Agent, or Firm* — Osha Bergman Watanabe & Burton LLP

(57) ABSTRACT

One aspect of the invention relates to an electric plug (1) for connection to a vehicle camera (18), comprising a plug head (2) and at least one electric signal contact (4) and at least one ground contact (5), which are configured on the plug head (2), wherein the plug head (2) comprises a carrier block (7) for the signal contact (4) and the ground contact (5), and the carrier block (7) comprises a jacket wall (8), on which a cover collar (9) projecting outwardly and extending circumferentially on the jacket wall (8) is arranged, wherein an outwardly projecting shielding flap (10, 11) of the plug (11) is integrally formed with the cover collar (9), wherein the shielding flap (10, 11) is connected to a connecting element (Continued)

Figure 1:
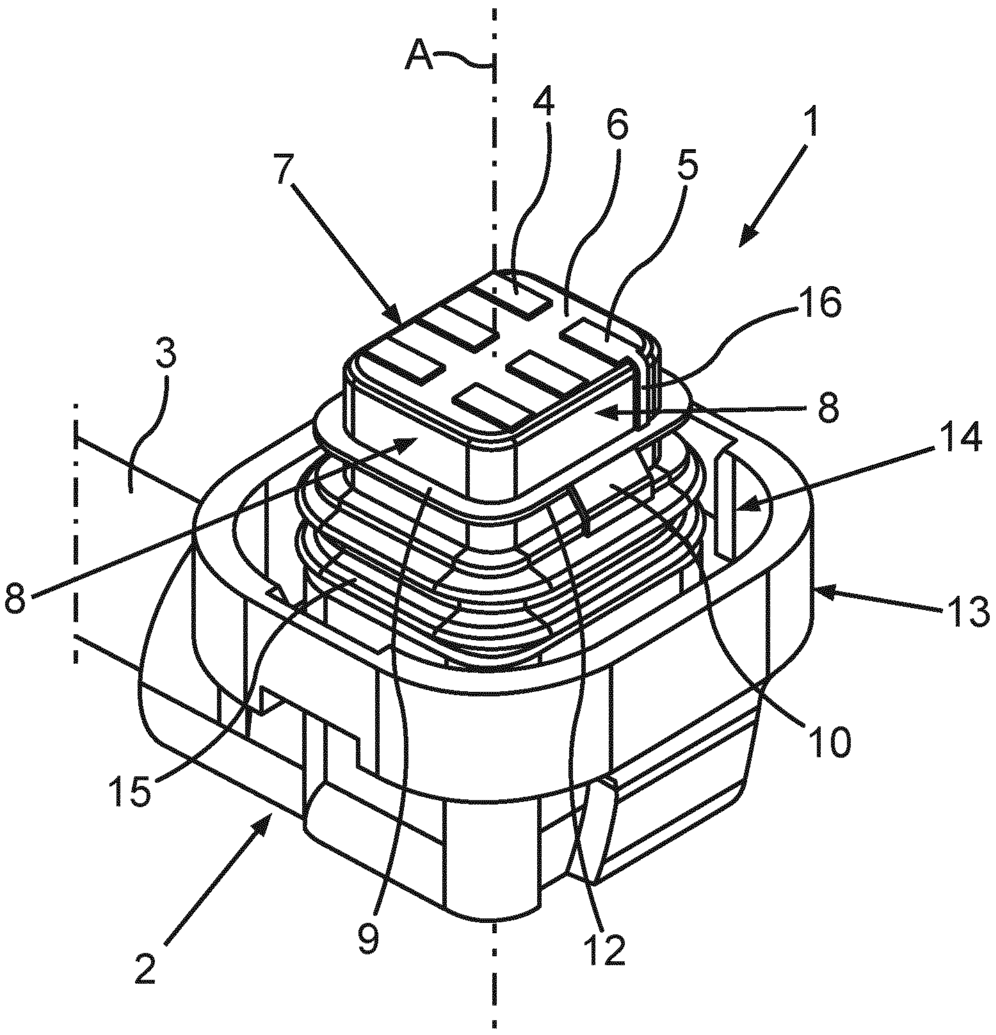

(16), which is electrically connected to the cover collar (9) and the ground contact (5). One aspect relates to an arrangement (17).

15 Claims, 3 Drawing Sheets

(58) Field of Classification Search
CPC ............ H01R 13/2421; H01R 13/2428; H01R 12/714; H01R 13/24; H01R 13/2407; H01R 13/2414
See application file for complete search history.

(56) References Cited

U.S. PATENT DOCUMENTS

| | | | | |
|---|---|---|---|---|
| 7,695,289 | B1 * | 4/2010 | Sato ........................ | H01R 13/11<br>439/78 |
| 9,437,972 | B2 * | 9/2016 | Endo .................. | H01R 13/6315 |
| 10,071,696 | B2 | 9/2018 | Park | |
| 2012/0225575 | A1 * | 9/2012 | Tagawa ............. | H01R 12/7023<br>439/345 |
| 2016/0268716 | A1 | 9/2016 | Conger et al. | |
| 2017/0201661 | A1 | 7/2017 | Conger | |
| 2018/0034175 | A1 * | 2/2018 | Lloyd .................... | H01R 24/60 |
| 2019/0227411 | A1 | 7/2019 | Park et al. | |

* cited by examiner

ELECTRIC PLUG FOR CONNECTION TO A VEHICLE CAMERA, AS WELL AS ARRANGEMENT

One aspect of the invention relates to an electric plug for connection to a vehicle camera. The electric plug comprises a plug head. Moreover, the electric plug comprises at least one electric signal contact and at least one ground contact, which are configured on the plug head. A further aspect of the invention relates to an arrangement comprising a vehicle camera and an electric plug.

Vehicle cameras are known in manifold designs. Commonly they are of compact structure and can be arranged so that they capture the environment of the motor vehicle. Vehicle cameras are commonly connected with electric plugs so that an exchange of signals is facilitated. Such electric plugs commonly are to be connected non-destructively releasably with the vehicle camera. For instance such designs are known from the U.S. Pat. No. 10,071,696 B2 and the JP 2007022364 A.

Such connections, however, with regard to the electric shielding have to comply with high safety requirements. In the known embodiments in this connection very complex solutions are envisaged. These are only partly suitable, on the one hand, relatively expensive, on the other hand.

It is the task of the present invention to provide an electric plug as well as an arrangement comprising such an electric plug and a vehicle camera, by which the electromagnetic shielding is improved.

This task is solved by an electric plug and an arrangement according to the independent claims.

One aspect of the invention relates to an electric plug for connecting to a vehicle camera. The electric plug comprises a plug head. The electric plug moreover comprises at least one electric signal contact and at least one ground contact that is separate therefrom. The electric signal contact and the ground contact are configured on the plug head. The plug head comprises a carrier block for the signal contact and the ground contact. The carrier block comprises a jacket wall, on which a cover collar projecting outwardly from the jacket wall and extending circumferentially on the jacket wall is arranged.

An outwardly projecting shielding flap of the electric plug is configured to be integrally formed with the cover collar. The shielding flap is connected with an electrically conductive connecting element, which is connected with the cover collar and the mass contact. By such a design of the electric plug an improved electromagnetic shielding is facilitated. In particular if the electric plug is connected with the vehicle camera, this cover collar, which is moreover also arranged at a specific location, namely on a jacket wall of a carrier block, is particularly suited, to cover gaps between the electric plug and the housing of the vehicle camera so that from these gaps the emitting of the electromagnetic field is at least reduced. Thereby the electromagnetic shielding is improved. In particularly advantageous way, moreover, the concept of the integrally formed shielding flaps at the same time a grounding of the housing of the vehicle camera is facilitated. This is because in the plugged together state between the electric plug and the vehicle camera this shielding flap contacts the housing of the vehicle camera. Thereby in a simple and still highly efficient way this housing of the vehicle camera can be brought to ground potential. Thus, also already upon plugging together of the plug with the vehicle camera the electric grounding of the housing is achieved safely and reliably. In that by the specifically arranged connecting element the shielding flap is reliably connected with the ground contact of the plug head, here, too, no undesired electric potentials can develop on the shielding flap. As the plug head comprises a corresponding solid carrier block, on the one hand, the positioning of the named contacts can be achieved safely and reliably. On the other hand, thereby also a raised number of contacts thereon can be realized. The carrier block moreover is also a correspondingly stable body, which can also reliably receive and retain the cover collar.

Preferably, it is envisaged that the shielding flap is arranged to project at an angle from the cover collar. In particular this shielding flap is arranged to project freely outward and cantilevering. By this design it is arranged in particular exposed, in order to allow for best possible direct contact with the housing of the vehicle camera upon plugging together.

Preferably, it is envisaged that at least two separate shielding flaps are envisaged. These are arranged opposite in the circumferential direction around the longitudinal axis, which also simultaneously corresponds to the extension direction of the electric plug upon being plugged together with the vehicle camera. This means that these two shielding flaps are offset against each other by 180°.

In an advantageous embodiment it is envisaged that the shielding flap is configured resiliently on the cover collar. Thereby a certain movement elasticity is achieved. This is particularly advantageous in order to facilitate when being plugged together with the vehicle camera a certain movement and deformation and moreover then also a pre-stressed seat or a pre-stressed contact of the shielding flap on a wall of the vehicle housing. Thereby always a direct contacting of the shielding flap with the housing of the vehicle camera can be achieved.

Preferably it is envisaged that the carrier block is configured as cuboid. The cuboid preferably comprises a front wall, on which the ground contact and the signal contact are arranged. By this shape design a very robust functional body is formed. The common plug and retention forces are thereby advantageously configured.

Advantageously it is envisaged that the cover collar relative to the front wall of the carrier block viewed in the direction of the longitudinal axis is offset towards the back and is arranged on the jacket wall. Thereby the position of the cover collar is adjusted to the position of the carrier block, if the carrier block is plugged into the vehicle camera.

Thereby the position of the cover collar can be reached in such a way that a possible gap between the electric plug, in particular the carrier block, and the housing of the vehicle camera is directly covered.

Preferably it is envisaged that the cover collar is configured to extend fully closed circumferentially on the jacket wall. On the one hand, thereby a particularly high stability of the cover collar is achieved, on the other hand, in particularly advantageous manner a possible gap between the electric plug, in particular the carrier block, and a housing of the vehicle camera can be covered fully circumferentially.

Preferably it is envisaged that the cover collar and the at least one shielding flap is configured to be made from electrically conductive material, in particular from metal. The electromagnetic shielding, on the one hand, and the contacting of the housing of the vehicle camera with electric ground potential is thereby possible in a particularly advantageous way.

Preferably it is envisaged that the shielding flap is configured to be uneven. In particular it is configured to be bent at least once. By such design a simple mounting process can be achieved. This means that the plugging of the electric plug into the housing of the vehicle camera is facilitated without jamming. By this design of the shielding flap an undesired jamming or seizing during moving relative to the wall of this housing can be avoided.

Advantageously it is envisaged that the connecting element is configured as L-shaped strip. Thereby the connecting element is designed to be as small as possible and an as short as possible connecting path between the cover collar and thus also the shielding flap, on the one hand, and the ground contact, on the other hand, is achieved.

In an advantageous embodiment it is envisaged that the plug head comprises a plug cap. In this plug cap the carrier block, which is separate thereto, is preferably received. It projects outwardly through an opening of the plug cap in the direction of the longitudinal axis of the plug head.

Thereby the carrier block is still protected at least at that end which faces away from the vehicle camera or the housing of the vehicle camera.

Preferably it is envisaged that the cover collar is configured as electric shielding collar. In particular with regard to an electric shielding here a particularly advantageous embodiment both in terms of device as well as in terms of position is provided.

A further aspect of the invention relates to an arrangement with a vehicle camera and an electric plug that is separate therefrom. In particular the plug is configured according to the above-named aspect or an advantageous embodiment. The vehicle camera comprises a connector unit for connecting the electric plug.

By such arrangement a simple plug-connecting between the electric plug and the vehicle camera is facilitated. At the same time thereby it is achieved that a gap between the electric plug, in particular a carrier block of the electric plug, and a housing of the vehicle, which belongs to the connector unit, is covered. Thereby at this very point, namely the interface between the electric plug and the vehicle component a particularly advantageous embodiment for an electromagnetic shielding is achieved. At the same time it is also facilitated that the connector unit and thus the housing part of the housing of the vehicle camera is securely brought to ground potential.

Preferably it is envisaged that the connector unit is incorporated in a housing part of a housing of the vehicle camera. In this regard thus a single-piece design is created.

Preferably it is envisaged that the plug head in a state, in which it is plugged to the vehicle component, is introduced into the connector unit and the shielding flap contacts the inner side of a wall of the connector unit. Thereby an electrically conductive connection between the wall and the ground contact of the electric plug is configured.

Preferably it is envisaged that the plug head in a state, in which it is plugged to the vehicle camera, is introduced into the connector unit. In this state the carrier block of the electric plug extends into a passage opening in the housing part of the vehicle camera. By this passage opening in the housing part access to the interior of the housing of the vehicle camera is facilitated. A gap between the carrier block and a boundary wall bounding the passage opening is covered, in particular fully covered, by the cover collar.

The at least one signal contact and the ground contact are preferably configured as plate-like contacts. Preferably five signal contacts are configured. In particular these are all configured on the front wall of the carrier block.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by the separated feature combinations from the explained implementations. Implementations and feature combinations are also to be considered as disclosed, which thus do not comprise all of the features of an originally formulated independent claim.

Embodiments of the invention are explained in the following in further detail by reference to schematic drawings.

Figure 2:
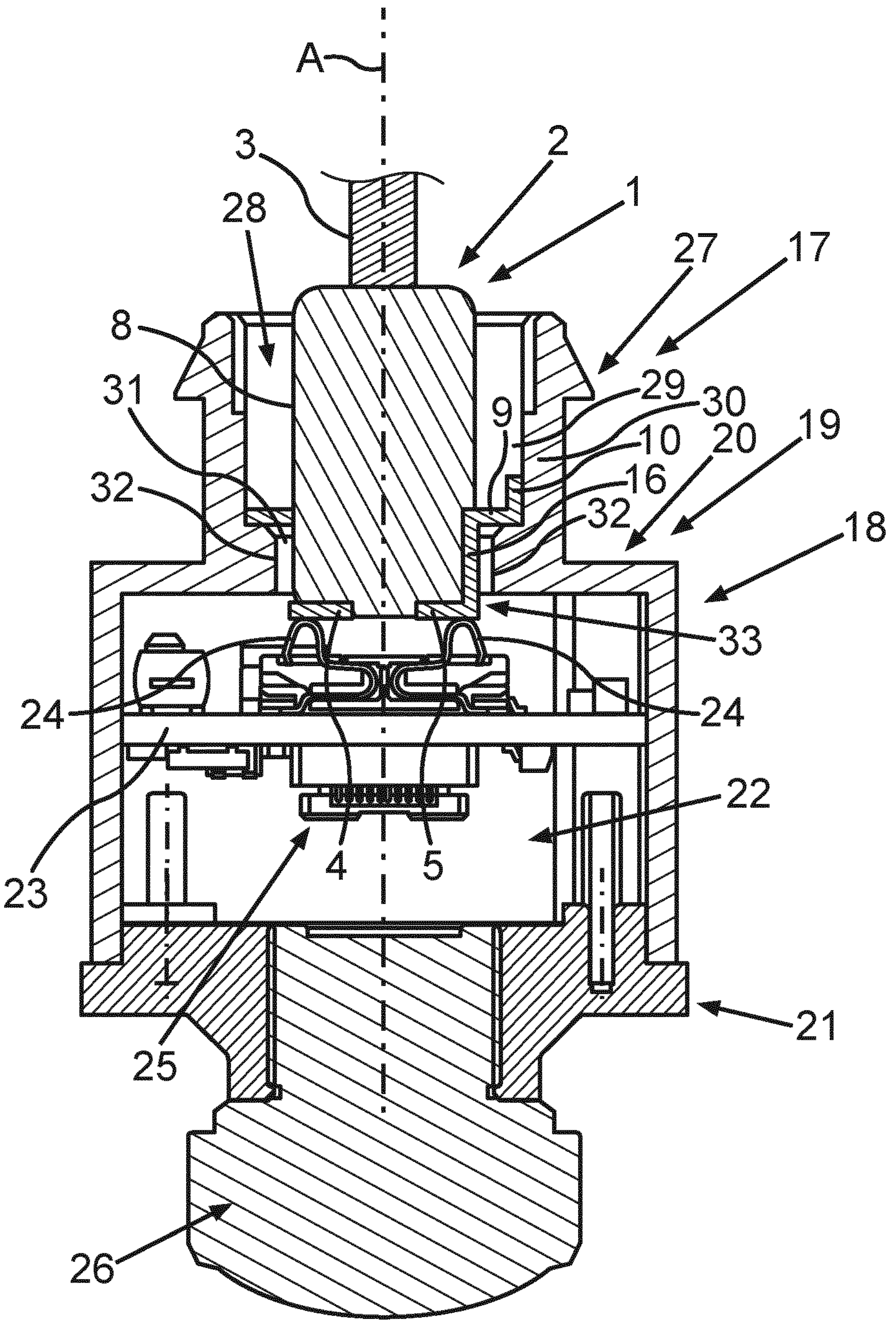
Figure 3:
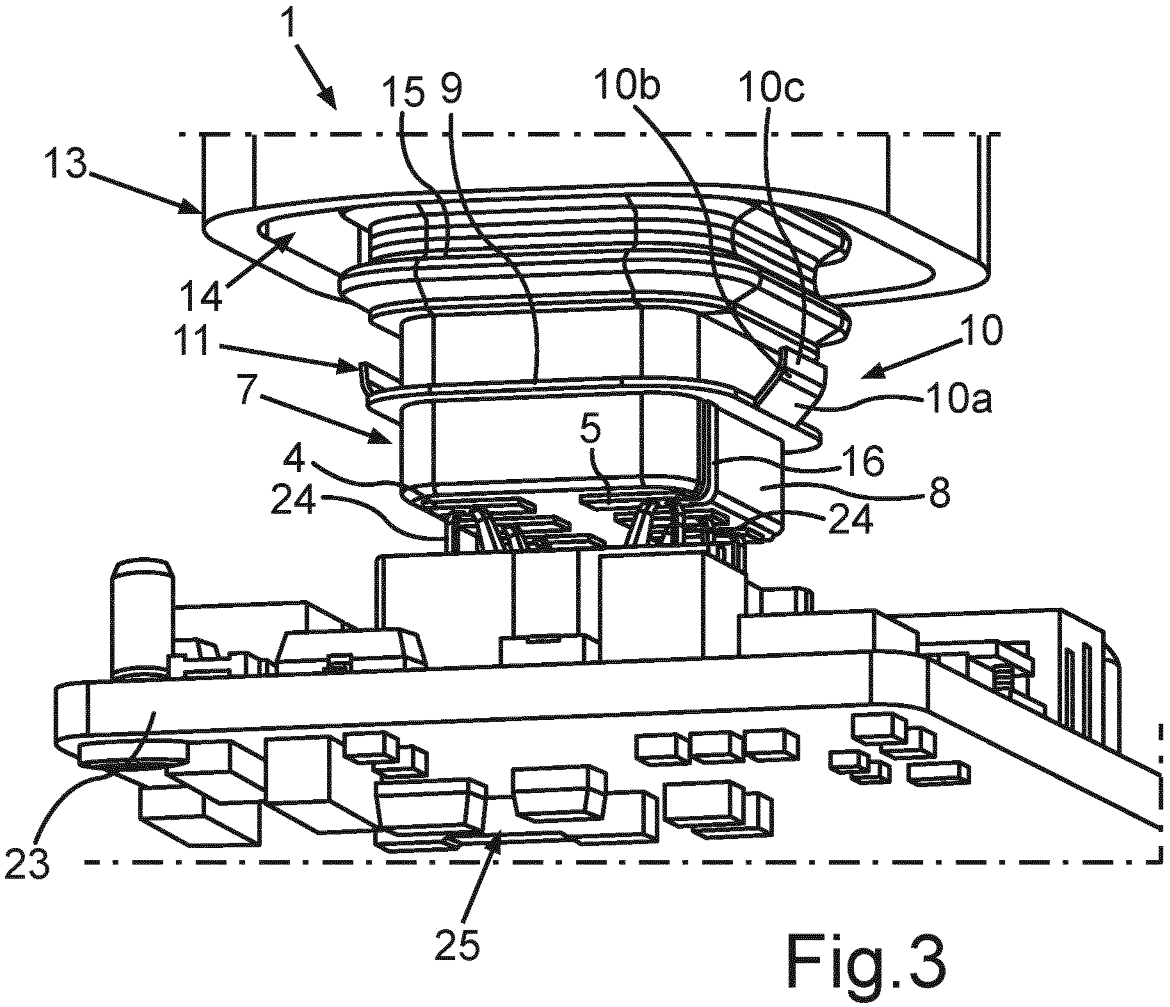

These show in:

FIG. 1 a perspective representation of an embodiment of an electric plug;

FIG. 2 a schematic view of a vertical section through an embodiment of an arrangement according to the invention with a vehicle camera and an electric plug according to FIG. 1; and FIG. 3 a perspective representation of sub-components of the plug according to FIG. 1 and a vehicle camera.

In the figures identical elements or elements having identical functions are equipped with the same reference signs.

In FIG. 1 in a perspective view an electric plug 1 is shown. According to its intended use, the electric plug 1 is envisaged for connecting to a vehicle camera. The electric plug 1 is a so-called "pig tail" plug. The electric plug 1 comprises a plug head 2. In this plug head 2 ends a cable 3 of the electric plug 1. In this cable 3 are arranged several individual cables. These lead to individual electric contacts of the electric plug 1. The electric plug 1 in this connection comprises at least one electric signal contact 4. In the embodiment five signal contacts 4 are provided, wherein only one is equipped with the reference sign 4. Moreover, the electric plug 1 has a ground contact 5. The signal contacts 4 and the ground contact 5 are configured in the embodiment as strips or plates. The plug head 2 has a longitudinal axis A. This corresponds to the vehicle camera, also in particular to the plug direction, during plugging together. As can be recognized, the signal contacts 4 and the ground contact 5 extend in a plate, which is oriented perpendicular to the longitudinal axis A. The signal contacts 4 and the ground contact 5 are arranged on a front wall 6 of a carrier block 7 of the plug head 2. The carrier block 7 is configured in the embodiment as cuboid. Additionally to this front wall 6 it comprises a jacket wall 8. This thus is configured multifaceted in the embodiment. On this jacket wall 8 a cover collar 9 is configured. The cover collar 9 is configured in circumferential direction of the longitudinal axis A in the jacket wall 8. The cover collar 9 is configured to be fully circumferentially closed. In relation to the jacket wall 8 viewed in a direction perpendicular to the longitudinal axis A it is outwardly projecting. On this cover collar 9 a first shielding flap 10 and a further shielding flap 11 (FIG. 3), which is separate therefrom, is integrally formed. The two shielding flaps 10 and 11, which are here exemplary, are thus formed as a single piece with this cover collar 9. The shielding flaps 10 and 11 extend from an outer edge 12 of the cover collar 9 projecting outward away from the jacket wall 8. They are not arranged in one plane, in which the cover collar 9 is formed. Rather the shielding flaps 10 and 11 in comparison with the plane, in which the cover collar 9 extends, are oriented in slanted position. The shielding flaps 10 and 11 are configured to be cantilevered. They are oriented to project in the manner of wings. The shielding flaps 10 and 11 are configured to face away projecting from the signal contacts 4 and the ground contact 5. The shielding flaps 10 and 11 are designed to be plate-like. They are, however, in particular configured to be uneven. In particular they are configured to be bent at least once.

As can be in particular discerned in FIG. 3 in this connection, the shielding flap 10 comprises a first flap part 10*a*. This first flap part 10*a* extends directly from the cover collar 9. To a bending point 10*b* a second flap part 10*c* is adjacent. As can be seen in FIG. 3, the second flap part 10*c* in relation to the plane, in which the cover collar 9 extends, has a smaller inclination than the first flap part 10*a*.

The plug head 2, as this can also be recognized in FIG. 1, in addition to the carrier block 7 comprises a plug cap 13. This is configured to be pot-like or trough-like. In the direction of the longitudinal axis A the carrier block 7 in relation to the plug cap 13 extends outwardly. In this connection the carrier block 7 thus extends through an opening 14 of the plug cap 13.

As can be recognized moreover, the cover collar 9 in relation to the front wall 6 is offset towards the back. This means that it is closer to the plug cap 13 than the front wall 6. Moreover the electric plug 1 comprises a jacket 15. The jacket 15 partly surrounds the jacket wall 8. In particular the jacket 15 surrounds the jacket wall 8. In particular the jacket in circumferential direction of the longitudinal axis A surrounds the jacket wall 8 completely, however, viewed in the direction of the longitudinal axis A surrounds the jacket wall 8 only partly. In particular a partial area of the jacket wall 8 between the cover collar 9 and a portion of the carrier block 7 extending in the plug cap 13 is covered by this jacket 15.

Moreover in FIG. 1 it can be recognized that the electric plug 1 comprises a connecting element 16. This connecting element 16 is electrically conductive. It connects the ground contact 5 with the cover collar 9. In particular thus also an electric connection between the ground contact 5 and the at least one shielding flap 10, in particular the here two shielding flaps 10 and 11, is configured. In particular the cover collar 9 and the therewith integrally formed shielding flaps 10 and 11 is configured to be made from an electrically conductive material, in particular from metal. As can be seen in FIG. 1, this connecting element 16 is configured to be L-shaped. It is in this connection a thin connecting strip. It extends in this connection with a leg of L-shape axially on the jacket wall 8 and with a further leg of L-shape up to the ground contact 5.

In particular the cover collar 9 is configured as electric cover collar. In the connected state with the vehicle camera it covers a gap between a connecting unit, in particular a housing part of a housing of the vehicle camera, and the carrier block 7. Thereby both a mechanical covering is achieved and also due to the electric properties an electromagnetic shielding facilitated. Thereby an exiting or an entering of undesired electromagnetic radiation through this gap can be avoided.

In FIG. 2 in a simplified vertical sectional view of an arrangement 17 is shown. The arrangement 17 comprises the electric plug 1 shown in a simplified representation. It moreover comprises a vehicle camera 18, which is separate from the electric plug 1. The vehicle camera 18 comprises a housing 19. This housing 19 has a rear housing part 20 and a front housing part 21, which is separate therefrom. The two housing parts 20 and 21 are connected with each other. Thereby an interior 22 of the housing 19 is formed. In this interior 22 at least one circuit board 23 of the vehicle camera 18 is arranged. On same electronic components and electric contacts 24 are arranged. Moreover there an image sensor 25 is arranged. The vehicle camera 18 moreover comprises a lens arrangement 26. This is represented as single block for the sake of simplicity. The lens arrangement 26 is arranged on the second housing part 21. Light, which is incident from the outside upon the lens arrangement 26, due to the optical imaging property is directed at the image sensor 25.

The vehicle camera 18 comprises a connector unit 27 for the electric plug 1. In the embodiment shown this is integrally formed with the rear housing part 20. The connector unit 27 according to its intended use is envisaged for plugging-in into the electric plug 1. For this purpose the connector unit 27 comprises a receiving portion 28, into which the electric plug 1, in particular with its plug head 2, is introduced or inserted. In FIG. 2 in this regard the fully plugged-in final state is shown. The shape and geometry of the plug head 2 are schematically shown in FIG. 2 and do not illustrate the exact geometry of the plug head 2 in FIG. 1. It can be discerned that the shielding flap 10, which here is shown merely symbolically, directly contacts an inner side 29 of a wall 30 of the connector unit 27. Thereby this connector unit 27 and also the housing part 20 are connected to ground. Moreover it can also be seen that a gap 31 between the jacket wall 8 and an inner side 32 of the connector unit 27 and/or the housing part 20 is covered. This is achieved by the cover collar 9. In particular a complete covering of this gap 31 is achieved.

The plug head 2 is introduced into the connector unit 27 and extends with the carrier hole 7 into a passage opening 33 in the housing part 20.

In FIG. 3 in a perspective view the arrangement 17 with sub-components of the vehicle camera 18 and sub-components of the plug 1 according to FIG. 1 are shown in more detail.

The invention claimed is:

1. An electric plug for connection to a vehicle camera, comprising:
   a plug head; and
   at least one electric signal contact and at least one ground contact, which are configured on the plug head,
   wherein the plug head comprises a carrier block for the signal contact and the ground contact, and the carrier block comprises a jacket wall, on which a cover collar projecting outwardly from the jacket wall and extending circumferentially on the jacket wall is arranged,
   wherein an outwardly projecting shielding flap of the plug is integrally formed with the cover collar, wherein the shielding flap is connected to a connecting element, which is electrically connected to the cover collar and the ground contact.

2. An electric plug according to claim 1, wherein the shielding flap is arranged to project at an angle from the cover collar.

3. An electric plug according to claim 1, wherein the shielding flap is configured in a resilient manner on the cover collar.

4. An electric plug according to claim 1 the carrier block is configured as cuboid, wherein the cuboid comprises a front wall, on which the ground contact and the signal contact are arranged.

5. An electric plug according to claim 4, wherein the cover collar relative to the front wall is arranged offset towards the back on the jacket wall.

6. An electric plug according to claim 1, wherein the cover collar is configured to extend fully closing circumferentially on the jacket wall.

7. An electric plug according to claim 1, wherein the cover collar and the at least one shielding flap are configured to be made from electrically conductive material.

8. An electric plug according to claim 1, wherein the shielding flap is configured to be uneven and bent once.

9. An electric plug according to claim 1, wherein the connecting element is configured as L-shaped strip.

10. An electric plug according to claim 1, wherein the plug head comprises a plug cap, in which the carrier block is received and projects outwardly through an opening of the plug cap.

11. An electric plug according to claim 1, wherein the cover collar is configured as electric shielding collar.

12. An 9 arrangement comprising: a vehicle camera; and the electric plug according to claim 1, wherein the vehicle camera comprises a connector unit for connecting the electric plug.

13. The arrangement according to claim 12, wherein the connector unit is incorporated into a housing part of a housing of the vehicle camera.

14. The arrangement according to claim 12, wherein the plug head in the state, in which it is plugged into the vehicle camera, is introduced into the connector unit and the shielding flap contacts an inner side of a wall of the connector unit so that an electrically conductive connection between the wall and the ground contact of the electric plug is configured.

15. The arrangement according to claim 12, wherein the plug head in the state, in which it is plugged into the vehicle camera, is introduced into the connector unit and the carrier block extends into a passage opening in the housing part, by which access to the interior of the housing of the vehicle camera is facilitated, wherein a slot between the carrier block and a boundary wall bounding the passage opening is covered, in particular completely covered, by the cover collar.

* * * * *